United States Patent Office 3,453,513
Patented July 1, 1969

3,453,513
DYNAMO-ELECTRIC MACHINE
James John Bates, Esh Village, and Tiruchendurai Viswanathan Sridhar, Langley Park, England, assignors to National Research Development Corporation, London, England, a corporation of Great Britain
Filed Mar. 10, 1966, Ser. No. 533,181
Claims priority, application Great Britain, Mar. 19, 1965, 11,755/65
Int. Cl. H02p *3/06;* H02k *29/00*
U.S. Cl. 318—138                          7 Claims

ABSTRACT OF THE DISCLOSURE

A D.C. motor or generator having two commutators each with a small number of segments separated by intersegmental insulation, the spans of the segments and insulation being equal. Leads from each supply terminal are taken to both commutators and a thyristor is included in each lead. Also each lead terminates in a pair of brushes the overall span of which equals the span of a commutator segment. The thyristors are not triggered to conduct until the leading brush of a pair lies wholly on a segment and the effect of the wide spacing between a pair of brushes ensures that there is an adequate overlap period for commutation during which both leads are passing current and an extinction voltage for a thyristor can be generated by interpoles at running speeds or by an A.C. injection at slow periods.

---

Figure 1:
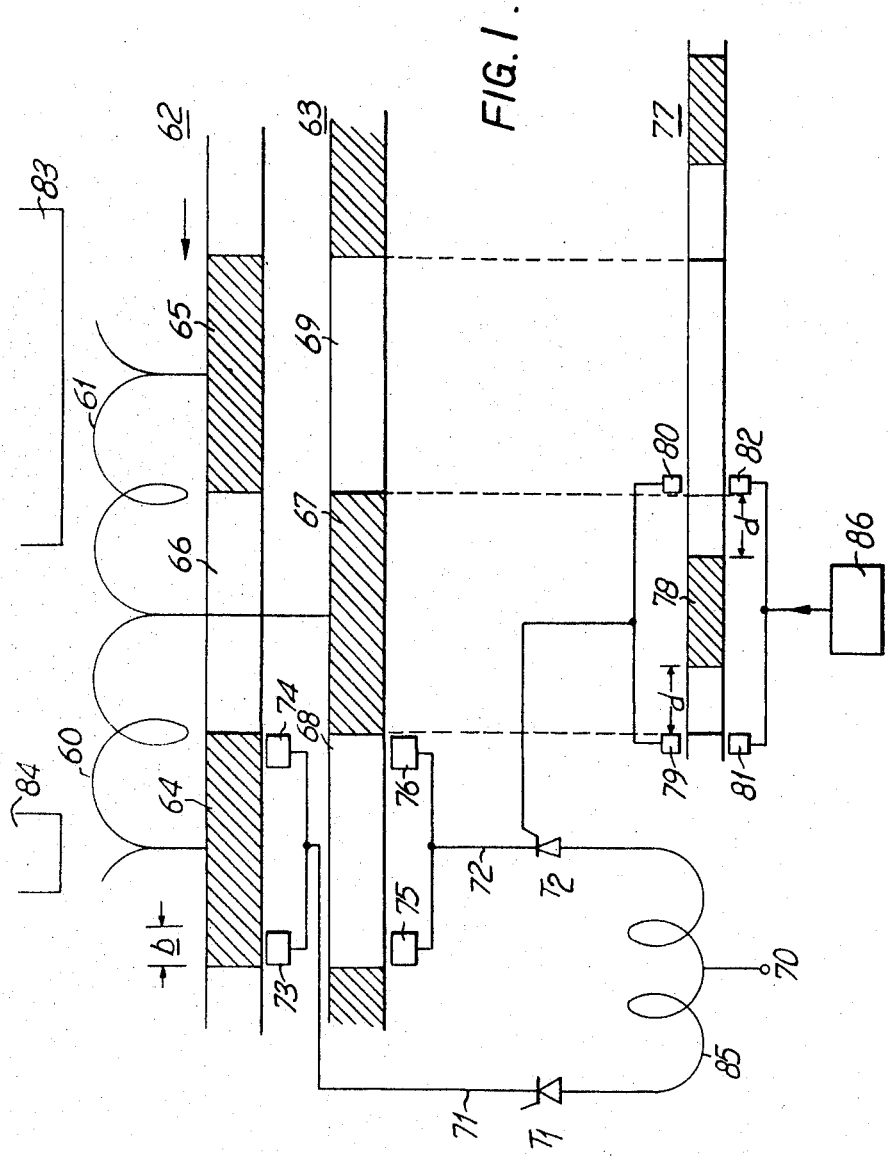

This invention relates to dynamo-electric machines and is particularly concerned with machines which utilise commutators.

The defects of conventional sliding-contact commutators are well-known. Among them may be mentioned the expense of manufacturing a commutator having a large number of segments which require to be insulated from each other and which require to have a very accurate profile to enable a brush to make simultaneous contact with two or more segments. Furthermore it is necessary to design the armature to maintain the reactance voltage as low as possible by extensive sub-division of the armature coils and low slot fluxes. Even in such conditions it is difficult to obtain an exact balance between the commutating electro-motive force and the electro-motive force induced by the interpoles, so that sparking often occurs.

It is an object of the present invention to provide a dynamo-electric machine having improved sliding-contact commutation.

According to the present invention in another aspect a dynamo-electric machine is provided with an armature having a closed winding and a pair of commutators to the segments of which the winding is connected in alternate sequence, a pair of current leads from each supply terminal terminating in brushes lying on the respective commutators, and each lead including a triggered electronic discharge device, means for triggering each discharge device into its conducting state when the brush at the end of the lead in which such device is included is lying on a commutator segment, and means for enabling voltages to be applied in circuits comprising a pair of leads from a common terminal when simultaneously connected to segments of each commutator and the part of the armature winding between them so as to extinguish a discharge device before the brush to which it is connected leaves a commutator segment.

In a machine in accordance with the invention each commutator has very many fewer segments than in a conventional commutator, and each segment spans an appreciable arc of the rotor. The segments may be secured either to the surface of a cylinder or else to a disc mounted on the rotor shaft.

In a machine constructed in accordance with the invention a pair of brushes are provided at the ends of each lead and the span of the brushes of a pair is not more than the span of a segment of a commutator, the spacing between adjacent segments of the commutator being not less than the span between the brushes of a pair, it being arranged that triggering of a discharge device occurs only when one of the brushes of a pair lies wholly on a segment and extinction occurs before the other of the brushes of a pair leaves that segment.

Various arrangements can be provided for generating voltages to extinguish the triggered electronic discharge devices. One convenient arrangement is to provide interpoles of conventional kind positioned between the main poles of the field winding. Alternatively the centre line of the brushes, or between pairs of brushes, may be displaced relative to the neutral axis of the main poles so that the triggered electronic discharge devices are extinguished by voltages generated by magnetic flux from the main poles. Another arrangement is to inject an alternating voltage into the circuits formed by the triggered electronic discharge devices and the part of the armature winding between them. It is pointed out that the extinction voltages do not require to have an exact value provided that they are sufficiently large to ensure that a sufficient reverse voltage appears across the triggered electronic device that it is desired to extinguish.

In carrying out the invention the triggered electronic discharge devices may comprise thyristors or similar solid-state devices.

Triggering of the discharge devices is conveniently carried out by means of an auxiliary commutator mounted on the rotor shaft on which brushes bear which are connected to the trigger electrodes of the discharge devices.

A machine constructed in accordance with the present invention may be inverted, that is to say the armature winding is provided on the stator or outer stationary part of the machine while the field winding is provided on the rotor or inner rotating part. It will be understood that such an inverted construction is quite practicable since in view of the small number of segments that are required for the commutator, or for each commutator, the construction of the stator winding and the connections therefrom to the two commutators is relatively simple. The rotor of the machine carries the field windings and the commutator brushes and may also carry the triggered electronic discharge devices which are supplied from the supply terminals through slip rings.

It will be appreciated that a machine constructed in accordance with the invention is capable of acting either as a motor or as a generator and in accordance with another aspect of the invention an electrical power system comprises a generator connected to supply electrical power to one or more motors both the generator and the motors being constructed in accordance with the invention. The generator has interpoles by means of which voltages are generated for extinguishing the triggering electronic discharge devices of the generator and coupling means are provided from the generator to couple these extinction voltages to the motors so as to provide the requisite voltages in the motors to extinguish the triggering discharge device associated therewith. By this means it is not necessary to provide interpoles in the motors since the extinction voltages are provided by the interpoles which form part of the generator. Alternatively a deficiency in interpole strength in the motor can be compensated by extra interpole strength in generator.

Since the extinction voltages generated by the interpoles of the generator are pulsating the couplings from the generator may conveniently include two transformers the primary windings of which are each connected between a respective pair of triggered discharge devices of the generator between which commutation occurs. These windings are centre-tapped to provide the D.C. output supply terminals of the generator. The secondary windings of the two transformers are connected together and to two similar transformers provided on the motors but operating in the reverse sense, that is their primary windings are supplied from the secondary windings of the generator transformers and their secondary windings are connected between the pairs of triggered discharge devices of the motors between which commutation occurs. The secondary windings of the motor transformers are centre-tapped to provide the D.C. input supply terminals of the motors.

Figure 2:
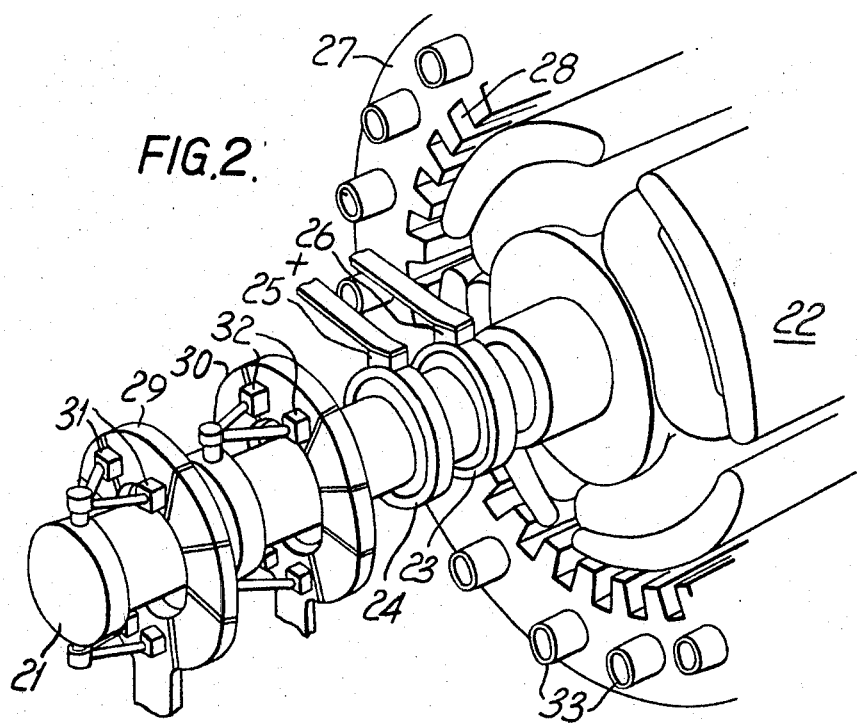
Figure 3:
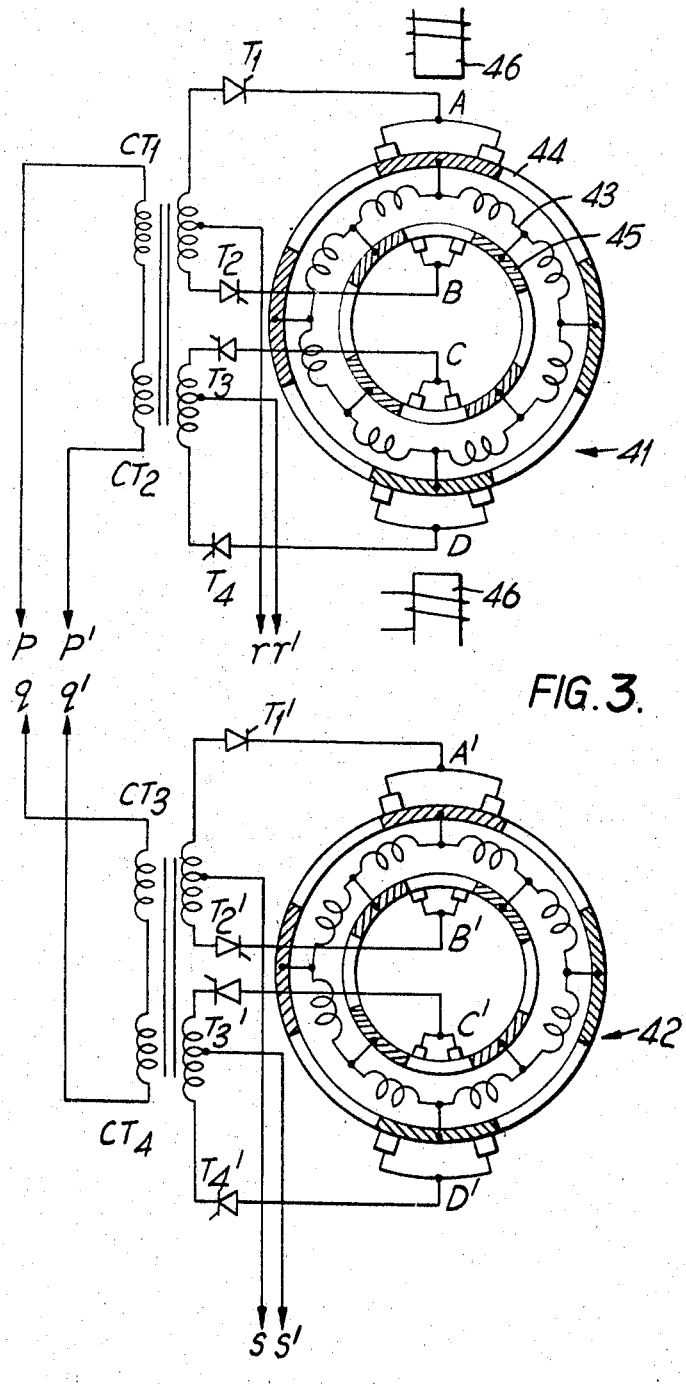
Figure 4:
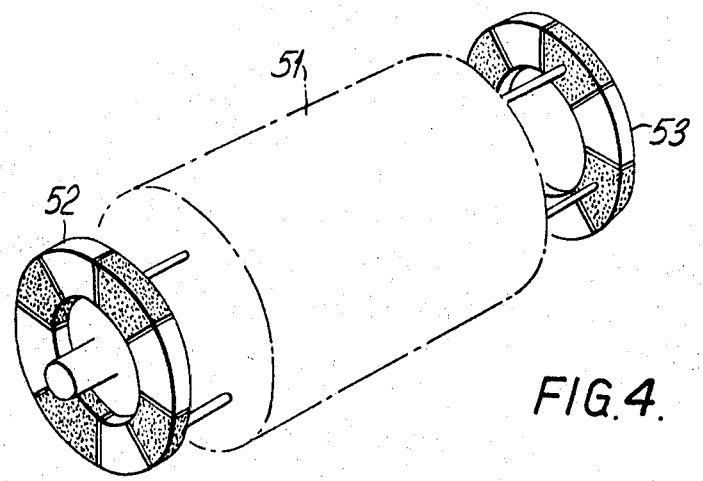
Figure 5:
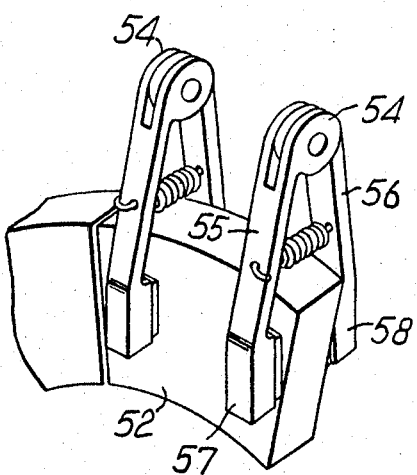

In order that the invention may be more fully understood reference will now be made to the accompanying drawings in which:

FIG. 1 illustrates diagrammaticaly in opened-out form a machine having a double commutator, FIG. 2 illustrates a machine of inverted construction, FIG. 3 illustrates diagrammatically a system comprising a generator and a motor embodying the invention, FIG. 4 and FIG. 5 illustrate a construction of disc commutators and brushes.

Referring now to FIG. 1 there is shown therein a dynamo-electric machine which has a conventional kind of field winding in the form of poles and pole 83 is illustrated. Interpoles 84 are also provided. The machine has a conventional armature winding of which two of the coils 60 and 61 are illustrated in the figure. The armature is provided with two commutators 62 and 63 each of which consists of four segments each subtending an angle of one-eighth of a full circle and separated by spacers of an equal span. Parts of these commutators are illustrated, thus segments 64 and 65 with a spacer 66 between them are illustrated in a commutator 62 while a segment 67 with spacers 68 and 69 on either side is illustrated in commutator 63. It will further be seen that the commutators 62 and 63 are so aligned relative to each other that a segment in one commutator is in line with a spacer in the other commutator.

Each supply terminal is connected to both commutators through a respective pair of leads terminating in brushes each of which leads includes a triggered electronic discharge device or thyristor. Thus a supply terminal 70 is connected to two leads 71 and 72 through a centre-tapped winding 85 the purpose of which is described below. Lead 71 includes a thyristor $T_1$ and terminates in a pair of brushes 73 and 74. Lead 72 includes a thyristor $T_2$ and terminates in a pair of brushes 75 and 76. The span between brushes 73 and 74 and similarly between brushes 75 and 76 is just less than the span of a commutator segment so that it is not possible for a lead to be connected to two commutator segments simultaneously. While connections from one supply terminal are illustrated it will be understood that a similar arrangement connected to the other supply terminal is provided on the opposite side of the armature.

FIG. 1 also illustrates an arrangement for providing triggering pulses to the thyristors. Details of an arrangement for triggering thyristor $T_2$ is shown and a similar arrangement is also provided in order to trigger thyristor $T_1$. This arrangement comprises an auxiliary commutator 77 provided with four conducting segments, such as segment 78, positioned in line with the corresponding segments of commutator 63 but of smaller span. The trigger electrode of thyristor $T_2$ is connected to a pair of brushes 79 and 80 which lie on commutator 77 and are spaced apart by an amount just greater than the span of a segment of the main commutator. A further pair of brushes 81 and 82 also bear on commutator 77 in line with the respective brushes 79 and 80. Brushes 81 and 82 are connected together and to a source of gate pulses 86. The distance $d$ in the position shown in FIG. 2 determines how far brush 76 is to proceed onto segment 67 before thyristor $T_2$ is fired. This distance provides a delay for ensuring that brush 76 is fully in contact with segment 67 irrespective of any minor variations between the levels of segment 67 and spacer 68 before current is allowed to pass. The minimum values of the distance $d$ is the width $b$ of the main brushes.

It will be appreciated that the above described arrangement is suitable for a machine rotating in either direction since it is of symmetrical construction.

Consider the operation of the machine when running with the brushes positioned as shown in FIG. 1, the direction of motion of the armature being to the left. It is assumed that thyristor $T_1$ has already been fired so that current passes through the armature through brushes 73 and 74 and commutator segment 64, with the return path for the armature current being provided by means of a similar pair of brushes (not shown) bearing on commutator 62 and positioned diametrically opposite the brushes 73 and 74. The machine functions in conventional manner due to the interaction of the current in the armature winding with the magnetic flux generated by the main poles 83 of the field winding. As the commutators move to the left relative to the brushes, brush 74 leaves segment 64 and makes contact with spacer 66, but there will be no change in the distribution of current in the armature since brush 73 still remains in contact with segment 64 and now carries all the armature current. Brush 76 makes contact with segment 67 of commutator 63 but this brush does not yet carry any current since thyristor $T_2$ is not fired. Eventually segment 78 of auxiliary commutator 77 moves between the two brushes 79 and 81 bearing on the auxiliary commutator and when this happens thyristor $T_2$ is fired due to the application of gate pulses from gate pulse generator 86 to its trigger electrode. Current now flows into the armature through brush 76 and segment 67 of commutator 63 in addition to current flowing to the armature through brush 73 bearing on segment 64 of commutator 62. A complete circuit is now constituted comprising the two current leads 71 and 72 and the thyristors $T_1$ and $T_2$ included in them, segments 64 and 67 of the two respective commutators, and the part 60 of the armature winding connected between these segments. The effect of the interpole 84 is to induce a voltage in coil 60 of the armature winding which appears as a reverse voltage across thyristor $T_1$ to extinguish this thyristor. To prevent arcing it is necessary to ensure that the voltage thus induced by the interpole is sufficient to reduce the current through thyristor $T_1$ to zero before brush 73 leaves commutator segment 64. Thus the interpole need only be designed to supply the limiting value of volt-seconds for commutation and unlike in a conventional machine does not have to provide an exact balance of voltages in the coil that is being commutated.

It will be noted that commutation does not commence until the brush 76 is firmly established on segment 67 and it is not necessary for any brush to make simultaneous contact with two adjacent segments as in conventional commutators so that small differences in surface level between segments and adjacent spacers do not cause any problems.

As the machine continues to rotate thyristor $T_1$ is eventually triggered by means of an auxiliary commutator of similar design to auxiliary commutator 77 and commutation then takes place in coil 61 of the armature and thyristor $T_2$ is extinguished. This cycle repeats continuously as the machine runs.

In the arrangements described above commutation is brought about entirely by the action of the thyristors and not by the passage of brushes over the commutator segments. Furthermore when a brush changes from being inactive to being active by the triggering of a thyristor, that brush is always lying well on a single segment only and never bridges a segment and an adjacent spacer. The difficulties of uncertain contact due to changes in surface level do not arise provided that the surfaces are reasonably smooth.

While in the above described arrangements the thyristor extinction voltages are induced by interpoles it is possible to dispense with the interpoles by offseting the brushes to one side of the neutral axis of the machine the main flux generated by an appropriate main pole can be utilised for commutation.

Alternatively in the place of the interpoles the required extinction voltages can be induced in the winding 85 by constituting these windings as the secondary windings of a transformer. By supplying winding 85 with an alternating voltage of sufficient magnitude and frequency commutation is achieved up to any desired speed. The A.C. supply need not have a sinusoidal waveform and can for example be generated by an inverter circuit from the same D.C. supply as is used to feed the armature.

In place of an auxiliary A.C. supply for energising winding 85 these windings may be energised by the dynamo-electric effect by being positioned in proximity to an electromagnet or permanent magnet arranged to be rotated. For a machine having a single commutator with eight sgements, or a pair of commutators each with four segments, and rotating at a speed $n$, the speed of rotation of the magnet will need to be $4n$. This arrangement is convenient where a D.C. generator is driven through 4:1 reduction gear since the magnet can then be driven directly from the input shaft of the gear.

It will be appreciated that where interpoles 84 can be dispensed with more space is available in the machine to allow the span of the main poles to be extended.

In cases where commutation is produced by the interpoles or by flux from the main poles these voltages will not be sufficient to extinguish the thyristors and produce commutation when the machine is started from rest. One arrangement for ensuring that sufficient extinction voltages are available when starting is to energise the armature from an A.C. supply applied between terminal 70 and the corresponding terminal connected to the other set of brushes. With such an arrangement reversal of the supply voltage will extinguish the thyristors when required. Such an A.C. supply voltage will be only required for starting.

Alternatively if it is not desired to provide a main A.C. supply for starting, an auxiliary A.C. supply can be induced in coil 85 during starting only by constituting these coils as the secondary windings of transformers. With such an arrangement, as the machine picks up speed the commutating voltage provided by the interpoles will act simultaneously with the voltage provided by the transformer. It is possible for these voltages to be in opposition for a half cycle but if the interpole strength is more than twice that required for commutation in the available time in the absence of the alternating voltage then the interpole induced voltage will always offset the transformer voltage should this happen to oppose commutation. Alternatively, the secondary windings of these transformers can be shorted out and the primary supply removed once the machine has picked up sufficient speed for the interpole induced voltage to be adequate.

An advantage of a machine constructed in accordance with the invention is that the diameter of the commutators can be less than any conventional machine. This is particularly the case in the machine described with reference to FIG. 1, where brushes 73, 74, 75 and 76 each carry current for an average of one-quarter of the total time and each can have a width of one-quarter of the width of a commutator segment. This is equivalent in a conventional machine to having a single brush spanning one-eighth of the periphery of the commutator which would be impossible due to the large number of commutator segments that would be shorted out by such a wide brush. As the combined width of the four brushes supplied from the same terminal in the FIG. 1 arrangement need be more than the width of a single brush of a conventional machine designed for the same armature current the width of the segments of the commutators utilised in the FIG. 1 arrangement need be no more than the width that is required for a brush in a conventional machine. As the brush width of the conventional machine is, say one-twentieth of the commutator periphery this means that the diameter of the commutators 62 and 63 can be much smaller than the conventional commutator for a machine of equivalent rating so that much higher speeds of rotation of the thyristor machine is then possible for the same peripheral speed of the brushes.

Since it is not necessary to have a large number of subdivisions in the armature it is possible to build a machine in which the commutator is mounted externally to the frame when only a limited number of leads needed to be taken through to the armature winding. The commutator can now be mounted on its own sealed enclosure flexibly connected to the machine shaft and so be free from the effects of shake.

It is pointed out that the rating of the thyristors is much less than the power of the machine. Since each thyristor is only conducting for half the time a current rating of half the armature rating is sufficient while the voltage of the thyristors needs to be only equal to the maximum interpole induced or commutating voltage, which, of course, is very much less than the machine voltage.

A further advantage of a machine constructed in accordance with the invention is that the commutator does not now limit the armature leakage reactance so that deeper slot windings and higher armature fluxes can be designed for.

FIG. 2 illustrates a D.C. machine of inverted construction. The rotor 21 of the machine carries poles 22 and interpoles (not shown) which are connected between slip-rings 23 and 24 mounted on the shaft of the rotor. Slip rings 23 and 24 are energised by brushes 25 and 26 connected to the positive and negative supply terminals of the machine. The stator is provided with winding slots 28 for an armature winding and this winding is connected to the segments of a pair of stationary commutators 29 and 30 to provide an arrangement similar to that illustrated in FIGURE 1 except that in this case it is the armature winding and commutator that is stationary. Sets of brushes 31 and 32 which make electrical contact with commutators 29 and 30 are mounted on the shaft of the rotor 21 to rotate therewith and are supplied from the slip rings 23 and 24. The thyristors necessary to achieve commutation are also mounted on the rotor 21 and are connected between slip rings 23 and 24 and the brushes.

It is possible with such an arrangement to construct a very large high power D.C. machine and if required it is possible to provide for liquid cooling of the armature winding either directly through the copper contained in the slots 28 or else through tubes such as tubes 33 which extend through the stator core. The construction takes advantage of the fact that only a limited number of connections are required between the stator winding and the commutators.

FIG. 3 illustrates in diagrammatic form a generator 41 designed to supply a motor 42. Both generator 41 and motor 42 are similar in construction to the machine illustrated in FIG. 1. Generator 41 has a closed armature winding 43 the coils of which are connected in alternate sequence to two commutators 44 and 45 each consisting of four segments. Commutator 44 has bearing thereon diametrically opposed pairs of brushes A and D and the commutator 45 has a pair of brushes B positioned as the brushes A and another pair of brushes C positioned at the same angular position as the brushes D. Brushes A are connected together and to the primary winding of transformer $CT_1$ through a thyristor $T_1$ and brushes B are connected together and through a thyristor $T_2$ to the other end of the primary winding of transformer $CT_1$. The centre tap of transformer $CT_1$ is connected to an output terminal $r$ of the generator. In like manner brushes C are connected together and through a thyristor $T_3$ to one end of the primary winding of a transformer $CT_2$ while brushes D are connected together and through a thyristor $T_4$ to the other end of the primary winding of the transformer $CT_2$. The centre tap of transformer $CT_2$ is connected to the other output terminal $r'$ of the machine. The secondary windings of transformers $CT_1$ and $CT_2$ are connected together in series and to terminals $p$ and $p'$. Generator 41 has a conventional field winding and interpoles 46.

Motor 42 is constructed in a similar manner to the generator 41. The supply terminals $s$ and $s'$ of the motor are fed from the generator output terminals $r$ and $r'$. Terminals $s$ and $s'$ are connected to the centre tapes of secondary windings of transformers $CT_3$ and $CT_4$. The ends of the secondary winding of $CT_3$ are connected through thyristors $T_1'$ and $T_2'$ to pairs of brushes A' and B' and the ends of the secondary winding of transformer $CT_4$ is connected through thyristors $T_3'$ and $T_4'$ to the pairs of brushes C' and D' diametrically opposite the sets of brushes A' and B'. Motor 42 is not provided with interpoles and the extinction voltages necessary to extinguish the thyristors associated with motor 42 are provided by the pulsating voltages generated in transformers $CT_1$ and $CT_2$ and which appear at terminals $p$ and $p'$ to energise the primary windings of transformers $CT_3$ and $CT_4$.

In operation of the system illustrated in FIG. 3 both generator 41 and motor 42 operate in the manner already described in connection with FIGURE 1 and the interpole voltages induced between the leads to the brushes of the two commutators by means of the interpoles 46 are coupled through the transformers $CT_1$ and $CT_2$ to the auxiliary output terminals $p, p'$ of the generator and from there through the auxiliary input terminals $q, q'$ of the motor to transformer $CT_3$ and $CT_4$. Thus whenever a circuit is completed between pairs of thyristors, i.e. between the pair of thyristors $T_1'$ and $T_2'$ or the pair of thyristors $T_3'$ and $T_4'$ then a pulsating voltage will be applied in this circuit from the associated current transformer $CT_3$ or $CT_4$ to cause a reverse voltage to appear across the appropriate one of the thyristors to extinguish it and thus ensure proper commutation.

With the system described above it is possible to construct a motor of smaller dimensions than the associated generator but which will deliver a similar amount of power since smaller interpoles or no interpoles at all are required in the motor. Alternatively, if the motor 42 does have interpoles then the pulsating voltages supplied from the generator will serve to achieve commutation on starting. The commutating transformers utilized in the system need not be large since the frequency of the pulsating voltage induced in them will be high. Thus, for example, for a generator running at 1,200 r.p.m. the frequency of the commutating voltage will be 160 cycles per second.

While in FIG. 3 there is shown only one motor supplied from a generator it will be understood that a number of motors can be supplied in parallel and the provision whereby the interpoles on the motors are dispensed make the system particularly advantageous in diesel electric traction.

Where interpoles are utilized in any of the machines described above it is convenient to connect them so that they are shunt-fed rather than series-fed. This ensures that the interpoles are always held at full strength so that the machine has far superior interruption and remake properties than a conventional D.C. machine because the interpole flux is always available, whereas in a conventional machine the interpole flux is absent when the current is initially established and is slow in building up relative to the build-up of the armature current itself.

FIG. 4 illustrates a convenient construction for the two commutators that are required in machines embodying the invention. In place of the conventional drum type commutator, disc commutators may be used and the two commutators may be positioned at opposite ends of the armature. In FIG. 4 an armature 51 is shown with disc commutators 52 and 53 positioned at opposite ends thereof. Each of the commutators 52 and 53 consists of a number of conducting sectors which conduct on both there surfaces.

The construction of the brush holders is illustrated in FIG. 5. Each brush unit 54 which makes contact with a commutator consists of a pair of spring loaded calliper arms 55 and 56 carrying brushes at each of their ends. Arms 55 and 56 are mounted to extend generally radially of the axis of the machine. Radial shock will not effect contact between the brushes and the commutators while any axial shock will cause the brush at the end of one arm to reduce the pressure on the commutator but at the same time increases the pressure of the brush at the end of the other arm.

We claim:
1. A dynamo-electric machine comprising:
an armature having a closed winding;
a pair of commutators each comprising conducting segments and intersegmental insulation, the intersegmental insulation having spans equal to the spans of the segments;
connections distrubuted round the armature winding and taken to each commutator in turn;
a pair of current leads from each supply terminal to the commutators, the individual leads of a pair being taken to respective commutators;
triggered electronic discharge devices included in each of the current leads;
a pair of brushes bearing on a commutator terminating each of the current leads, the span of a commutator segment being at least as great as the overall span of a pair of brushes bearing thereon;
the commutators and pairs of brushes being so positioned that each supply terminal is always connected to a segment on at least one commutator and as the machine rotates is intermittently connected to segments on both commutators simultaneously to complete circuitual paths each embracing a pair of current leads and the triggered electronic discharge devices included in them and a portion of the armature winding; and
extinction voltage generating means for applying extinction voltages through such circuitual paths to a triggered electronic discharge device included therein during such intermittent connection.

2. The machine as claimed in claim 1 in which the extinction voltage generating means comprising interpoles provided between the main poles of the field winding.

3. The machine as claimed in claim 1 in which the extinction voltage generating means comprises means for injecting alternating voltage in the said circuits.

4. The machine as claimed in claim 3 in which said means for injecting alternating voltages in the said circuits include centre-tapped alternating current windings the centre-tap of a winding being connected to a supply terminal and the ends of a winding being connected to said current leads.

5. The machine as claimed in claim 1 which is inverted and has its armature winding provided on the outer stationary part thereof and its field winding provided on the inner rotating part.

6. An electrical power system comprising a dynamo-electric machine as claimed in claim 1 and arranged to function as a generator together with at least one dynamo-electric machine as claimed in claim 1 and arranged to function as a motor, and in which the extinction voltage generating means in the generator comprises interpoles and the extinction voltage generating means in said at least one motor comprises coupling means for supplying the extinction voltages generated in the generator to the said at least one motor.

7. The electrical power system as claimed in claim 6 in which said coupling means comprises two transformers associated with the generator the primary windings of which are connected between a respective pair of triggered discharge devices of the generator and the secondary windings of which are connected together and to the primary windings of two similar transformers associated with a motor, the secondary windings of the motor transformers being connected between respective pairs of triggered discharge devices of a motor.

References Cited
UNITED STATES PATENTS

| | | | |
|---|---|---|---|
| 2,231,607 | 2/1941 | Westendorp | 310—220 |
| 2,595,024 | 4/1952 | Toulon | 307—136 |

ORIS L. RADER, *Primary Examiner.*

K. L. CROSSON, *Assistant Examiner.*

U.S. Cl. X.R.

307—136; 310—220; 318—439; 322—72